United States Patent
Siepker

[11] Patent Number: 6,019,436
[45] Date of Patent: Feb. 1, 2000

[54] MOTOR VEHICLE WITH A PARKING BRAKE SYSTEM

[75] Inventor: Achim Siepker, Munich, Germany

[73] Assignee: Bayerische Motoren Werke Aktiengesellschaft, Germany

[21] Appl. No.: 08/911,188

[22] Filed: Aug. 14, 1997

[30] Foreign Application Priority Data

Aug. 14, 1996 [DE] Germany .......................... 196 32 863

[51] Int. Cl.⁷ .................................................. B60T 13/00
[52] U.S. Cl. ...................... 303/13; 188/156; 188/106 F; 188/106 P; 303/14
[58] Field of Search .................................... 188/353, 156, 188/158, 106 P, 106 F, 162, 170, 72.6; 303/89, 6.1, 3, 20, 18, 15, 9.61, 13, 14, 191, 192; 477/4, 26, 194–198, 901, 186, 92, 201; 192/219.4, 219.6, 222, 221; 74/5.5, 536

[56] References Cited

U.S. PATENT DOCUMENTS

| | | | |
|---|---|---|---|
| 3,809,191 | 5/1974 | Woodward | 188/162 |
| 4,658,939 | 4/1987 | Kircher et al. | 188/156 |
| 4,671,577 | 6/1987 | Woods | 188/156 |
| 4,795,002 | 1/1989 | Burgei et al. | 188/156 |
| 5,004,077 | 4/1991 | Carlson et al. | 188/162 |
| 5,302,008 | 4/1994 | Miyake et al. | 188/156 |
| 5,318,355 | 6/1994 | Asanuma et al. | 188/156 |
| 5,340,202 | 8/1994 | Day | 303/19 |
| 5,370,449 | 12/1994 | Edelen et al. | 303/3 |
| 5,433,512 | 7/1995 | Aoki et al. | 188/156 |
| 5,511,859 | 4/1996 | Kade et al. | 188/156 |
| 5,533,795 | 7/1996 | Brooks | 303/6.1 |
| 5,696,679 | 12/1997 | Marshall et al. | 477/94 |
| 5,704,693 | 1/1998 | Mackiewicz | 303/3 |

FOREIGN PATENT DOCUMENTS

| | | |
|---|---|---|
| 048 642 B1 | 6/1990 | European Pat. Off. . |
| 33 22 422 A1 | 1/1985 | Germany . |
| 34 10 006 A1 | 1/1985 | Germany . |
| 35 18 715 C2 | 11/1986 | Germany . |
| 35 18 715 C2 | 1/1989 | Germany . |
| 39 09 907 A1 | 1/1990 | Germany . |
| 42 18 717 A1 | 1/1993 | Germany . |
| 195 16 639 | 5/1995 | Germany . |
| 195 13 004 A1 | 1/1996 | Germany . |

Primary Examiner—Douglas C. Butler
Attorney, Agent, or Firm—Evenson, McKeown, Edwards & Lenahan, P.L.L.C.

[57] ABSTRACT

A motor vehicle parking brake system which is operated by non-muscular energy, includes both by a hydraulic pressure generator and by an electromechanical control unit. A control unit ensures that the switch between hydraulic and electromechanical operation is made as a function of the operating state of the vehicle.

18 Claims, 1 Drawing Sheet

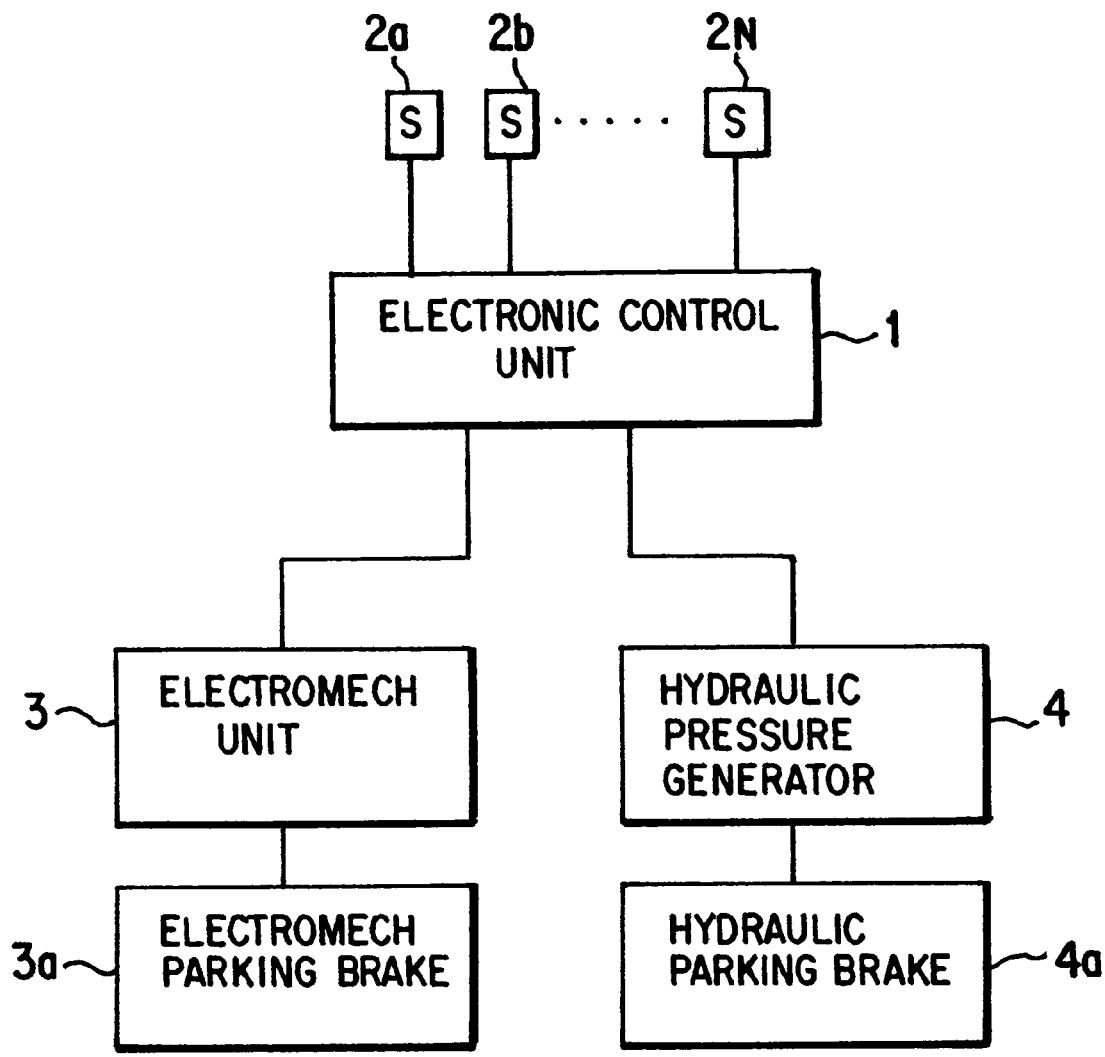

6,019,436

MOTOR VEHICLE WITH A PARKING BRAKE SYSTEM

BACKGROUND AND SUMMARY OF THE INVENTION

The invention relates to a motor vehicle parking brake system, which is operable by non-muscular energy.

A motor vehicle is known from European patent document EP 0 478 642 B1, for example, in which an electric motor acts on the parking brake through a threaded spindle. Operation of the parking brake by non-muscular energy relieves the burden on the driver. In addition, convenience functions such as "stopping at a light", "starting assistance", etc. can be performed.

German patent document 195 16 639, moreover, describes a motor vehicle whose parking brake can be operated by a hydraulic pressure generator, for example a power brake controllable by non-muscular energy or an ASC (anti-slip control) pump.

The object of the invention is to provide an improved parking brake system of the generic type referred to above.

This goal is achieved by the parking brake system according to the invention, which is operable both by a hydraulic pressure generator and an electromechanical unit, which are selectively activated as a function of the operating state of the vehicle. The combination of hydraulic and electromechanical actuation of the parking brake according to the invention permits optimum use of the advantages of the two systems. The choice of operating mode or the switch between the two modes is preferably accomplished automatically, (without intervention by the driver), with one or more control devices that detect parameters of the vehicle, environment, driver's wishes, etc. acting accordingly on the hydraulic pressure generator or its valves or on the electromechanical control unit.

Hydraulic actuation permits rapid application and release of the parking brake (a few tenths of a second by comparison to one to two seconds with electromechanical operation) and is designed according to the system for a large number of load changes. Hydraulic actuation allows high braking pressures to be applied without difficulty, but results in relatively high cost (expense, weight, space requirements) for electromechanical control units.

The electromechanical control unit, assuming an intact on-board vehicle electrical system, can be used independently of the operating state of the vehicle.

In those vehicles that have a secondary brake circuit in addition to the primary service brake circuit, hydraulic actuation of the parking brake is possible with only a very slight additional expense. Such a secondary braking circuit serves for example for automatic slip control (ASC) or directional stability control (DSC) and uses as a pressure generator, for example, a power brake controllable by non-muscular energy or a separate pump (ASC or DSC) pump. The electromechanical control unit as a rule consists of an electric motor with a self-locking transmission.

Parking with hydraulic actuation can be performed by both the brake shoes of the service brake and by separate parking brake shoes. The electromechanical control unit as a rule acts on the brake shoes which in turn act either on brake discs or brake drums of the service brake or on separate brake drums.

The combination of the two operating modes offers a number of functional advantages that will be explained in the following with reference to the possible embodiments of the invention. It is sufficient in this respect to design the electromechanical control unit for only a relatively small number of load changes, since the frequently engaged convenience functions (stopping at a light, starting assistance) can be handled by the hydraulic actuation particularly well. Of course the parking brake system must be designed so that the switch to the other actuating device takes place only when the system to which the switch is being made has developed a braking force that is at least as high as the braking force in the system from which the switch is being made.

Other objects, advantages and novel features of the present invention will become apparent from the following detailed description of the invention when considered in conjunction with the accompanying drawings.

BRIEF DESCRIPTION OF THE DRAWINGS

The FIGURE is a schematic diagram of a system for implementing the switching between electromechanical and hydraulically actuated parking brake systems according to the invention.

DETAILED DESCRIPTION OF THE DRAWINGS:

The FIGURE of the drawing illustrates a basic system for controlling the actuation of the dual mode non-muscular actuated parking brake system according to the invention. An electronic control unit 1, which may be in the form of a CPU or other control system otherwise present on the vehicle, receives inputs from a plurality of sensors 2a ... 2n which are indicative of various operating parameters and conditions of the vehicle which are described in greater detail hereinafter. The electronic control unit 1 has been previously programmed to control the actuation of the electromechanical unit 3, on the one hand and the hydraulic pressure generator 4, on the other hand. Based on inputs from the sensors 2a ... 2n, the electronic control unit 1 selects the appropriate one (or both) of the power units, and generates control signals which are provided to the electromechanical unit 3 to actuate the electromechanical parking brake 3a and to the hydraulic pressure generator 4 to actuate the hydraulic brake 4a. Actuation of the respective brake systems, as well as switching therebetween, are performed in a well known manner, according to the switching criteria discussed hereinafter. It should be noted that certain mechanical components of the electromechanical parking brake 3a and the hydraulic parking brake 4a, (such as disks, drums, etc.) may be shared, as discussed hereinafter.

According to the invention, a basic distribution of the application areas for hydraulic and electromechanical operation of the parking brake is provided. While the parking brake is operated hydraulically when the vehicle is in use and all convenience functions (stopping at a light, starting assistance) are performed hydraulically, the electromechanical control unit takes over the application of the parking brake at the latest when the driver leaves the vehicle. As a result of this division of responsibilities, the overwhelming majority of operations of the parking brake are handled hydraulically. When the vehicle is parked (as well as in other operating states of the vehicle described in the following) the hydraulic pressure generator is relieved/replaced by the independent system of the electromechanical control unit, which is able to maintain the parking effect by mechanical locking, even when the vehicle has been left for a long space of time. When the switch to the electromechanical mode of operation takes place in brake systems in which hydraulic and electromechanical actuation act on the same locking elements of the parking brake, the electromechanical control unit can assume control over a brake that has already been set and thus utilize a portion of the hydraulically applied application force.

The term "use of the motor vehicle" generally refers to operation of the vehicle, including short travel interruptions during which the occupants remain in the vehicle. The term "parking the motor vehicle" on the other hand means that the occupants as a rule have left the vehicle.

Because of the predominantly hydraulic actuation of the parking brake, the electromechanical control unit need only be designed for a small number of load changes. In this way, the size of the control unit can be reduced. The manufacturing costs for the control unit are also reduced since more economical materials can be used, for example a plastic housing instead of a metal housing. Smaller dimensions for the electromechanical control unit also follow from the less strict demands on dynamics, since all of the time-critical parking processes can be handled by hydraulic operation. Thus, the electromechanical control unit need be designed to provide power only for reliable parking and stopping (for prolonged periods of time at rest or before the passengers leave the vehicle), for which relatively slow control speeds will suffice.

Although a parking brake device is known from German patent document DE 35 18 715 C2 that acts hydraulically on whichever axle of the vehicle not equipped with a parking brake that can be operated by muscle power, in order to be able to maintain the hydraulic parking action even when the vehicle is at rest for a long period of time, the hydraulic parking circuit must be monitored continuously, producing a repeated pressure build-up in the hydraulic parking brake circuit at ten- to thirty-minute intervals by control pulses to an electric motor. As a result, the unavoidable losses due to leakage in the hydraulic circuit are compensated. The known solution, whose goal differs fundamentally from the goal of the present invention, is very expensive and cumbersome. In contrast to the solution according to the invention, no electromechanical actuation by non-muscular energy is provided in DE 35 18 715 C2.

In one embodiment of the invention hydraulic locking is actuated when (a) the door lock on the driver's side is activated; or (b) the driver's door opens; or (c) the driver's seat is occupied; or (d) the ignition is turned on.

Hydraulic operation is replaced by electromechanical operation, on the other hand, as soon as these operating states of the vehicle ("engagement conditions") are terminated once more.

According to a feature of the invention whenever the door lock on the driver's side is activated or the driver's door opens, a change to hydraulic operation takes place even before the driver enters the vehicle. As a result, the noise produced by the change in operating mode or by the startup of the hydraulic system, which could be perceived as unpleasant by a vehicle occupant, is shifted to a point in time before the driver or passengers enter the vehicle. By remote control of the door locks using a so-called "radio key", the change to hydraulic operation can be performed before anyone enters the vehicle.

According to another embodiment of the invention, the switch to hydraulic actuation takes place at the moment the driver takes his seat behind the wheel. And in another embodiment, hydraulic actuation of the parking brake does not take place until the ignition is turned on. Of course, the change in operating mode can also take place in the "radio position" of the ignition key, in which various power consumers in the vehicle have already been connected to the on board electrical system.

The embodiments described above assure that the hydraulic system is activated even before the vehicle's engine has been started, and thus will always be available before the vehicle starts. This, of course, assumes that a hydraulic pressure generator that operates independently of the engine is available.

In another embodiment of the invention, hydraulic actuation is provided whenever the engine of the vehicle is operating. In pressure generators that are driven by the engine, the change to hydraulic actuation can take place only after the engine has been started.

In yet another embodiment, the beginning of hydraulic actuation takes place immediately before the vehicle is started. That is, in a vehicle with a manual transmission and a starting assistance function, a switch is made from electromechanical actuation of the parking brake system to hydraulic actuation whenever measures have been initiated by the driver to start the vehicle. As a result, an unnecessary switch between the individual operating modes is avoided, which would be necessary for example when shutting off and restarting the engine several times. For example, a starting process can be determined to have taken place when the driver has depressed the clutch or a sufficient starting torque is available. In this embodiment, the starting assistance is provided exclusively by metered release of the hydraulic locking setting.

As already mentioned above, the return from hydraulic to electromechanical actuation takes place as soon as the "engagement condition" for the hydraulic system is no longer present. For example, the switch to the electromechanical system may take place when the engine is shut off. One possible exception to this is the case when an engine is not running and the ignition is turned on. This situation occurs for example after an unsuccessful attempt at starting a vehicle with a manual transmission. In order to avoid unnecessary switching back and forth between hydraulic and electromechanical locking, it is advantageous in this case to operate the parking brake exclusively hydraulically as before. The initially suppressed switch to electromechanical actuation, however, takes place when another signal is present (for example an open contact on the driver's door or on the driver's seat) or after a predetermined time has elapsed after the engine has been shut off.

Further advantageous possibilities for selecting hydraulic or electromechanical actuation, including exceptions to the basic selection conditions, are set forth below:

When the parked vehicle is started, it is advantageous as a rule to release the electromechanically tensioned parking brake directly without having to switch to hydraulic actuation first. This merely assumes that a starting assistance function that may be provided (to make it easier to start a vehicle with a manual transmission on a hill) can be shifted with the electromechanical control unit. The (unmetered) release of the parking brake under all normal starting conditions on the level however poses no problem.

In vehicles with automatic transmissions the electromechanically set parking brake can likewise be simply released directly when the selector lever is moved out of the P position: undesired rolling of the vehicle is ruled out by the fact that the service brake must be operated to move the selector lever. On the other hand, when starting on a hill, the starting torque delivered by the converter prevents the vehicle from rolling backward. The invention can be used to replace a costly mechanism for automatically releasing the parking brake, such as is currently available on some production automobiles. In addition, the accelerator position or the starting torque delivered by the engine can be used as a criterion for releasing the parking brake.

Electromechanical operation of the parking brake may also be triggered in vehicles with an automatic transmission when P is engaged (the Park position on the automatic transmission) even with the engine running. The reason for this is that by selecting P, the driver as a rule is indicating that he wishes to keep the car at rest for a long period of time or to park the vehicle. By means of this embodiment, the transmission brake in automatic transmissions (parking brake) may be eliminated under certain conditions.

In addition, with the hood raised, electromechanical control also makes sense, since in this case it is assumed that travel will be interrupted for a long period of time. Here again, safety reasons speak for electromechanical operation of the parking brake. In order to reliably prevent the motor vehicle from starting, the "hood open" signal is designed as a dominant criterion, so that the parking brake cannot be released, even with the proper accelerator position or sufficient starting torque (stoplight function).

According to another embodiment of the invention, a time-delayed automatic switch to electromechanical operation of the parking brake is provided, thus avoiding overloading of the blocking valve in the hydraulic unit of the secondary brake circuit. When the load on the hydraulic system is relieved, valves with a shorter service life can be used. In addition, the automatic switch to electromechanical operation in vehicles in which the parking brake is set when the engine is switched off and the ignition is switched on, increases operating safety, since when the vehicle is at rest for a long space of time, the "trapped liquid pressure"(and hence the locking action) would fade as a result of unavoidable losses through leakage. For example, a switch can take place after two minutes following the beginning of hydraulic locking.

In a brake system already known of itself from German patent application 195 16 639, the hydraulic secondary brake circuit is used for an emergency brake application (if the service brake fails). Emergency brake application can be initiated in this case using the same device that controls the parking brake operated by non-muscular energy: below a certain speed of several kilometers per hour, the parking brake is actuated for example by pressing an electrical pushbutton once. Above the set speed, however, as is known from EP 0 478 642 B1, the electrical pushbutton must be kept depressed to initiate the described emergency brake application using the parking brake system.

According to another feature of the invention, redundancy in the emergency brake system can be provided by the fact that after the emergency brake application is initiated, if vehicle deceleration is too slow owing to a defect in the secondary brake circuit, failure of the hydraulic pump or a break in a hydraulic line is assumed to have occurred. In this case, the switch to the electromechanical control unit takes place automatically and as steadily as possible, either then continuing or initiating the emergency brake application. Of course, both systems can be activated simultaneously to achieve the best possible brake application.

According to another feature of the invention, in the case of an inadvertent failure to release the parking brake, it is automatically released when a preset vehicle speed is exceeded. As a result, in an especially simple fashion, overheating of vehicle brake components that can result in serious defects in the braking system, are avoided. This safety function is attractive for parking brake systems that are operated by non-muscular energy (without comfort functions such as stopping at a traffic light, starting assistance, etc.) in which the parking brake is not automatically released when the vehicle starts.

As is already known from European patent document EP 0 478 642 B1, when the vehicle is at rest the parking brake can be activated automatically. According to the invention, this is basically achieved initially by the hydraulic system of the secondary brake circuit. This "auto-stop function" can preferably be designed so that it can be engaged and disengaged, with the choice being made for example by a sliding pushbutton. A pushbutton of this kind for example has an operating button that can be slid into two positions, "apply parking brake"/"release parking brake" to apply or to release the parking brake in individual cases, using non-muscular energy. By pressing the button perpendicularly to the sliding direction, the automatic parking mode (auto-stop function) is selected. Pressing the button again switches back to the "deliberate parking of the vehicle by the driver" mode. The auto-stop function is advantageous in stop and go traffic for example. The selected auto-stop function can also be switched off again automatically, for example when a preset speed (50 km/h for example) or a preset speed in a gear (fourth gear for example) is exceeded for the first time.

Another embodiment of the invention relates exclusively to special vehicles like those used for racing or security vehicles in which a "handbrake turn" must be performed. A driving maneuver of this kind is initiated by a separate operating element that must be operated throughout the turn. As an alternative, the control can also be initiated by the same operating element that locks the vehicle, and the steering angle at the front axle can also being used to control the brake.

According to another feature of the invention, in metering the parking force, generally the maximum possible tensioning force is not applied, but only the tensioning force required to hold the vehicle, plus a safety margin. With hydraulic actuation, this produces the advantage of a gentler and more easily metered release of the parking brake. With electromechanical actuation, the reduction of the tensioning force at the parking brake reduces the load on the electromechanical control unit. The required braking pressure is determined and set by measuring the hydraulic brake pressure required to stop. During the requirement-oriented dimensioning of the parking force of an electromechanical parking brake, ideally a permanently active monitoring system is provided that increases the tensioning force as required, for example if the inclination of the vehicle changes (transport of the vehicle aboard ship, change in the slope of a parking space in a "duplex garage", etc.)

In addition, with such a system, the loss in tightening force during cooling of the brake discs (in those brake calipers in which the service and parking brakes act on a common brake disc) are compensated. Alternatively, the temperature at the brake disc can be calculated by a temperature model that measures and evaluates the previous braking processes and uses the results as a basis for setting the required tightening force for reliable locking of the vehicle, even after the brake disc has cooled off.

According to another feature of the invention, especially in parking brakes with a separate brake drum, the part of the parking brake system that is moved by the electromechanical control unit is kept operational throughout the lifetime of the vehicle. When the parking brake is used rarely, it tends to become difficult to operate. In addition, the brake shoes are insufficiently ground to fit the brake drums. By repeated gentle application of the parking brake in situations that do not adversely influence driving safety in any way (e.g., when using the engine for braking to slow down before a light for example), the parking brake is actuated slightly and in such a way that the driver does not notice.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A parking brake system for a vehicle, comprising:
   frictional braking means for applying a frictional braking force to wheels of said vehicle;
   a hydraulic pressure generator for actuating said frictional braking unit;
   an electromechanical unit for actuating said frictional braking unit;
   a plurality of sensors which generate signals indicative of operating conditions of the vehicle; and
   a control means for selectively and alternatively actuating said hydraulic pressure generator and said electromechanical unit to engage said parking brake according to said signals from said sensors, with said frictional braking means being actuated hydraulically when the vehicle is in use, and electromechanically when the vehicle is parked.

2. Parking brake system according to claim 1, wherein said vehicle is driven by an internal combustion engine, and wherein beginning with electromechanical actuation of the frictional braking means, said control means causes a switch to hydraulic actuation when the engine is started, and a switch electromechanical actuation when the engine is shut off.

3. Parking brake system according to claim 1, wherein said vehicle has a manual transmission and starting assistance function; and wherein starting with electromechanical actuation of the frictional braking means, after the engine is started, said control means causes hydraulic actuation of the parking brake only when measures have been initiated by the driver to start the vehicle.

4. Parking brake system according to claim 1, wherein said control means causes the frictional braking means to be immediately released from electromechanical actuation when a vehicle that has been parked is started.

5. Parking brake system according to claim 1, wherein said vehicle has an automatic transmission, and wherein said control means causes the frictional braking means to be actuated electromechanically when the automatic transmission is in the Park position.

6. Parking brake system according to claim 1, wherein the said control means causes the frictional braking means to be actuated electromechanically when the hood is raised.

7. Parking brake system according to claim 1, wherein said control means causes a switch to electromechanical actuation after a fixed period of time has elapsed following a beginning of a hydraulic actuation of the frictional braking means.

8. Parking brake system according to claim 1, wherein an emergency brake application using the parking brake system of the motor vehicle can be initiated above a speed limit of the motor vehicle, by controlling the hydraulic pressure generator.

9. Parking brake system according to claim 8, wherein a switch to electromechanical actuation takes place when a preset deceleration value is undershot during a hydraulic emergency brake application.

10. Parking brake system according to claim 1, wherein the parking brake is released automatically above a fixed vehicle speed.

11. Parking brake system according to claim 1, wherein the parking brake is activated automatically when the vehicle is at rest.

12. Parking brake system according to claim 1, wherein one wheel can be blocked or the wheels on one axle can be blocked or the wheels on one side of the vehicle can be blocked above a fixed vehicle speed by controlling the hydraulic pressure generator.

13. Parking brake system according to claim 1, wherein braking force exerted by the frictional braking means is dimensioned to match a required locking action.

14. Parking brake system according to claim 1, wherein the parking brake is periodically actuated electromechanically for maintenance purposes, without intervention by the driver.

15. A parking brake system for a vehicle, comprising:
    frictional braking means for applying a frictional braking force to wheels of said vehicle;
    a hydraulic pressure generator for actuating said frictional braking unit;
    an electromechanical unit for actuating said frictional braking unit;
    a plurality of sensors which generate signals indicative of operating conditions of the vehicle; and
    a control means for selectively and alternatively actuating said hydraulic pressure generator and said electromechanical unit to engage said parking brake according to said signals from said sensors,
    wherein beginning with electromechanical actuation of the frictional braking means, said control means causes a switch to hydraulic actuation whenever at least one of the following conditions occur:
        the door lock on the driver's side is activated;
        the driver's door opens;
        the driver's seat is occupied; and
        the ignition is turned on;
    and wherein a switch is made back to electromechanical actuation whenever at least one of said conditions ceases.

16. Parking brake system according to claim 15, wherein said vehicle is driven by an internal combustion engine, and wherein beginning with electromechanical actuation of the frictional means, said control means causes a switch to hydraulic actuation when the engine is started, and a switch to electromechanical actuation when the engine is shut off.

17. Method of controlling a frictional parking brake system for a motor vehicle, which parking brake system has a hydraulic pressure generator and an electromechanical unit which are alternatively actuatable to engage said parking brake, said method comprising:
    sensing a plurality of vehicle operating parameters and generating signals indicative of operating conditions of said vehicle; and
    selectively actuating said hydraulic pressure generator when said vehicle is in use, and said electromechanical unit when said vehicle is parked.

18. Method of controlling a frictional parking brake system for a motor vehicle, which parking brake system has a hydraulic pressure generator and an electromechanical unit which are alternatively actuatable to engage said parking brake, said method comprising:
    sensing a plurality of vehicle operating parameters and generating signals indicative of operating conditions of said vehicle;

selectively actuating said hydraulic pressure generator and said electromechanical unit such that said hydraulic pressure generator is actuated whenever at least one of the following conditions occur:
the door lock on the driver's side is activated;
the driver's door opens;
the driver's seat is occupied; and
the ignition is turned on;
and such that said electromechanical unit is actuated when at least one of the above conditions ceases.

* * * * *